US005879501A

United States Patent [19]

Livingston

[11] Patent Number: 5,879,501

[45] Date of Patent: Mar. 9, 1999

[54] METHOD OF SEALING SEWER SYSTEMS

[75] Inventor: Gregory J. Livingston, Chicago, Ill.

[73] Assignee: Illinois Tool Works, Inc., Glenview, Ill.

[21] Appl. No.: 770,691

[22] Filed: Dec. 19, 1996

[51] Int. Cl.[6] .......................... B29C 41/08; B29C 41/22; B29C 63/00; B29C 63/34

[52] U.S. Cl. .......................... 156/242; 156/293; 156/294; 264/34; 264/35; 264/269; 405/303

[58] Field of Search .............................. 156/71, 94, 242, 156/287, 293, 294; 264/34, 35, 36.15, 36.16, 36.17, 36.12, 269; 138/97, 98; 427/236, 238; 405/303, 36, 150.1, 155

[56] References Cited

U.S. PATENT DOCUMENTS

| | | | |
|---|---|---|---|
| 3,745,738 | 7/1973 | Singer | 264/34 |
| 4,009,063 | 2/1977 | Wood . | |
| 4,135,958 | 1/1979 | Wood . | |
| 4,434,115 | 2/1984 | Chick | 156/287 |
| 4,439,469 | 3/1984 | Wood . | |
| 4,581,247 | 4/1986 | Wood . | |
| 4,997,602 | 3/1991 | Trimble | 264/35 |
| 5,002,438 | 3/1991 | Strong | 405/303 |
| 5,017,313 | 5/1991 | Trimble | 264/35 |
| 5,108,533 | 4/1992 | Long et al. | 156/287 |
| 5,285,817 | 2/1994 | Sigel | 138/97 |
| 5,356,502 | 10/1994 | Kamiyama et al. | 156/287 |
| 5,405,218 | 4/1995 | Hyde-Smith . | |
| 5,415,499 | 5/1995 | Hyde-Smith et al. . | |
| 5,452,853 | 9/1995 | Shook | 239/7 |
| 5,536,457 | 7/1996 | Topf | 264/35 |
| 5,609,439 | 3/1997 | Schreiner et al. | 264/269 |

*Primary Examiner*—Steven D. Maki
*Attorney, Agent, or Firm*—Howard & Howard

[57] ABSTRACT

A method of sealing a polymeric lining of a manhole and the sewer lines communicating with the manhole which comprises forming insitu an integral substantially continuous monolithic polymeric coating or lining on the interior surface of the manhole adhered to the interior surface and substantially simultaneously forming a generally tube-shaped polymeric sealing member coaxially aligned with the manhole opening having an interior diameter generally equal to the interior surface of the manhole opening which is integral and continuous with the polymeric lining of the manhole preferably by spraying the interior surface of the manhole with a polymeric material having an isocyanate-terminated compound, most preferably a polyurea, then substantially simultaneously forming the tube-shaped polymeric sealing member of the same material as the manhole lining. Following curing of the polymeric manhole coating and the sealing member, the method includes inserting a tubular liner through the line communicating with the manhole into the tube-shaped sealing member having an uncured polymer on its exterior surface which is chemically compatible with the polymeric sealing member. The tubular sealing member is preferably formed by inserting a generally cylindrical form into the manhole opening which extends into the manhole, then applying the polymeric coating material sprayed on the interior surface onto the cylindrical form, thereby forming a generally tube-shaped member which is integral and continuous with the manhole lining.

10 Claims, 3 Drawing Sheets

36
32
46
50
48
52
48a
20
38
6
60
64
62
6

METHOD OF SEALING SEWER SYSTEMS

The present invention relates to an improved method of sealing underground sewer systems against the infiltration and inflow of groundwater, particularly during wet weather conditions. More particularly, the method of this invention relates to an improved method of sealing the lining of collection and transmission lines or sewer lines communicating with manholes to the lining of a manhole to create a single integrated sealed system.

BACKGROUND OF THE INVENTION

The sewer collection system is among the most valued assets of a community's infrastructure. As these systems age, problems associated with infiltration and structural deterioration significantly increase. With much of America's underground infrastructure well beyond fifty years in age, improved methods of rehabilitating and sealing sewer collections systems will be critical for this vital network. Current problems of system overload and bypass are largely attributed to the deteriorating conditions of the miles of collection and transmission pipelines. The most common method of rehabilitating and reconstructing sewer systems has been simply to replace aging sewer lines and replace the manholes. This method required digging out the sewer lines, which is a time consuming and expensive procedure. In populated areas, this procedure also results in substantial disruption of traffic and personal inconvenience. More recently, attention has begun to shift to reconstructing the sewer system. Two primary factors that created this shift were the introduction and acceptance of trenchless technology for pipeline reconstruction and the development and refinement of pipe inspection systems. Trenchless technology has provided a feasible and politically sound alternative for addressing problems in the sewer system. The most common trenchless technology includes lining the sewer lines with a cured in place pipe (CIPP) having a thermoset resin which is bonded to the sewer line and an interior impermeable preferably reduced friction film, such as polyurethane, on the interior surface. Improvements in lining manholes with a polyurea or polyurethane lining have also been introduced. These improved systems have not, however, been integrated in a way which prevents infiltration and inflow of groundwater into the manholes particularly along the exterior of the cured in place pipe.

The trenchless cured in place pipe technology generally includes inserting and inflatable tubular liner into the sewer line from one end. The liner includes an outer layer of felt of synthetic fibers, such as polyester, nylon or acrylic fibers, saturated with a thermoset resin and an inner layer bonded to the fibrous layer, such as a film of polyurethane, polyethylene, polyvinyl chloride, Neoprene, polyester or the like. In one method developed by Insituform International N.V. of the Netherlands, the tubular liner of the cured in place pipe is formed with the impermeable film on the exterior surface and the felt on the interior surface. When the flexible lining tube is inserted in the pipeline or passageway, one end is anchored and then the remainder of the tube is everted through the anchored ends so that the tube everts into the pipeline or passageway and onto the surface to be lined. The everting medium is usually liquid and when the inversion process is completed, the liquid remains inside the inverted tube to keep the pipeline or passageway surface shape while the resin in the felt layer cures. The resin may include a catalyst and may be cured by any conventional means, including heated water, air or even radiant heating. Examples of this technology are disclosed in U.S. Pat. Nos. 4,009,063, 4,439,469 and 4,581,247. Upon curing, the resin impregnated felt liner becomes rigid and is permanently bonded to the interior surface of the sewer line and the interior impermeable film reduces friction.

Improved methods of lining or relining manholes has also been more recently introduced. The preferred method includes spraying the internal surfaces of the manhole with a fast curing elastomeric material, preferably polyurea, whereby a homogeneous, non-porous and monolithic coating or lining is formed on the interior surfaces of the manhole. The surfaces of the manhole to be lined or relined will generally require preparation by cleaning the brick, tile, concrete block or mortar or foreign material, as required. In the most preferred method of lining or relining a manhole, a primer such as an aqueous solution of silane is sprayed on the prepared surface to improve adhesion of the elastomeric material to the interior surfaces of the manhole. Although the manhole lining is preferably a polyurea elastomeric material prepared by rapidly mixing and initiating the reaction of an isocyanate-terminated compound with an amine-terminated compound, it is also possible to line manholes using a polyurethane coating if the manhole is thoroughly dried before coating. U.S. Pat. Nos. 5,405,218 and 5,415,499 of Foamseal of Oxford, Mich. disclose an improved method of lining or relining manholes using a polyurea coating or lining.

As set forth above, however, the problem of infiltration and inflow of groundwater entering the sewer system remains even with the improved technology described above. Where a cured in place pipe is used in the sewer lines, groundwater will continue to flow along the exterior surface of the sewer lines into the manholes. Hydraulic capacity is thereby reduced due to excess flow which can impede future growth and development and when the sewer system becomes hydraulically overloaded, diluted untreated sewage may be bypassed directly into surface water. Thus, there remains a need to develop a method of integrating the lining of sewer lines and manholes to form a sealed system which prevents infiltration and inflow of groundwater around the cured in place pipe and the original sewer line into the manholes.

SUMMARY OF THE INVENTION

The method of sealing a manhole and a line, such as a sewer line, communicating with the manhole through an opening in the manhole of this invention includes first forming insitu an integral substantially continuous monolithic polymeric coating on the interior surface of the manhole which is adhered to the interior surface as described, for example, in the above-referenced patents of Foamseal. The method then includes forming a generally tube-shaped polymeric sealing member coaxially aligned with the manhole opening having an interior surface with a diameter generally equal to the interior surface of the manhole opening and which is integral and continuous with the polymeric manhole coating. Following curing of the polymeric manhole coating and the tube-shaped sealing member, the method of this invention includes inserting a tubular liner through the line into the cured tube-shaped sealing member having an uncured resin polymer on its exterior surface which is chemically compatible with the polymeric sealing member. Upon curing of the polymer on the exterior surface of the tubular liner, the liner is permanently chemically bonded to the internal surface of the polymeric sealing member, thereby sealing the communication between the line and the manhole. In the preferred method of this invention, the polymeric coating on the interior surface of the manhole is formed by spraying the manhole interior surface with a fast curing elastomeric material having an isocyanate-terminated compound, most preferably a polyurea, and generally simultaneously forming the tube-shaped sealing member of the same polymeric coating formed on the interior surface of the manhole, thereby forming a sealing member which is integral and continuous with the polymeric manhole coating.

In a preferred method of forming the tube-shaped sealing member, a generally cylindrical form is inserted into the manhole opening which extends into the manhole prior to forming the sealing member. The cylindrical form may, for example, be a cardboard tube which is formed by rolling a strip of cardboard and inserting the tube into the manhole opening. The exterior surface of the tubular form may be coated with a release agent, such as a conventional silicone release agent. The preferred method then includes spraying the interior surface of the manhole with a fast-curing elastomeric polymer, preferably including an isocyanate-terminated compound, and continuing to spray the polymeric coating on the exterior surface of the cylindrical form, thereby forming an integral continuous monolithic coating on the interior surface of the manhole which extends onto the cylindrical form, forming a tube-shaped polymeric sealing member which extends into the manhole. The inside diameter of the tubular sealing member is thus generally equal to the internal diameter of the opening of the line into the manhole and, upon insertion of the tubular liner through the line, generally equal to the external diameter of the tubular liner. The interior surface of the tube-shaped sealing member may also be roughened to provide both a chemical and a mechanical bond between the tubular liner and the tube-shaped sealing member.

The use of a plural component elastomeric polymer having an isocyanate-terminated compound, particularly a polyurea, in coating the interior surface of the manhole and forming the integral tube-shaped polymeric sealing member has several important advantages in the method of this invention. Such coating materials provide an excellent chemical bond with the epoxy resins on the exterior surface of the cured in place pipe described above. As described, the cured in place pipe generally includes an exterior layer of felt which is saturated with an epoxy resin. Upon expanding the "pipe" to engage the interior surface of the sewer line, the pipe is also expanded to engage the interior surface of the tube-shaped sealing member. Upon curing of the epoxy resin, the cured in place pipe also permanently bonds to the interior surface of the sealing member, integrating the lining of the sewer line with the coating on the interior surface of the manhole, sealing the communication to the manhole and preventing infiltration and inflow of groundwater into the manhole.

The method of this invention thus substantially eliminates infiltration of groundwater into the manholes from the sewer lines entering the manholes utilizing both the improved trenchless technology and method of lining or relining a manhole. Other advantages and meritorious features of this invention will be more fully understood from the following description of the preferred embodiments, the appended claims and the drawings, a brief description of which follows.

DESCRIPTION A PREFERRED EMBODIMENTS

Figure 1:
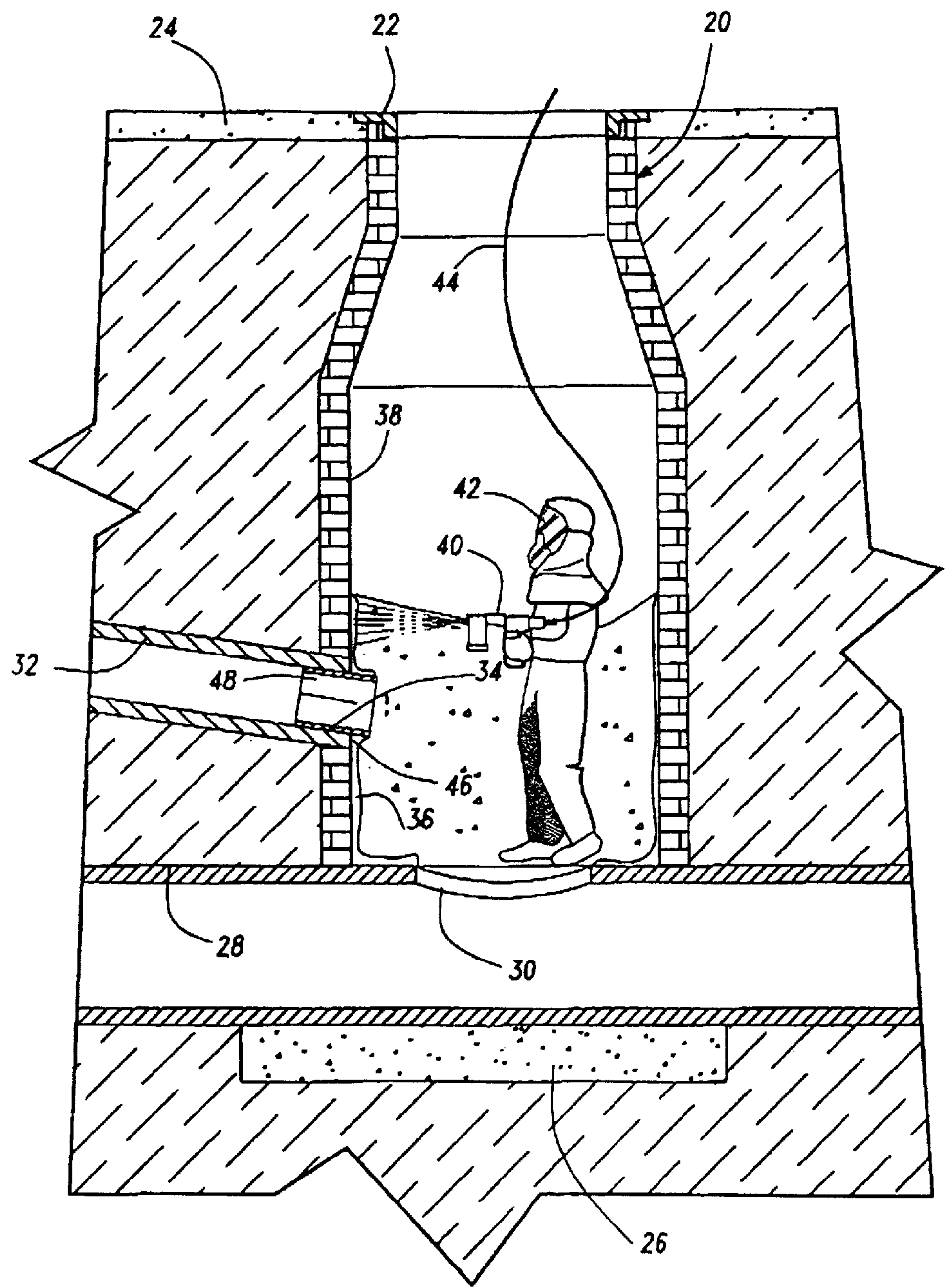
FIG. 1 illustrates a preferred method of forming a continuous monolithic polymeric coating on the interior surface of a manhole and a generally tube-shaped polymeric sealing member.

As described above, the method of this invention includes forming insitu a substantially continuous monolithic flexible polymeric coating or liner adhered to the interior surface of the manhole and an integral generally tube-shaped polymeric sealing member, preferably of the same polymeric material as the manhole coating. As shown in FIG. 1, a conventional manhole 20 is generally bottle-shaped and formed of a cementitous material, such as bricks and mortar. The manhole opening generally includes an annular frame 22, usually metal, for receiving the manhole cover (not shown) allowing access to the interior of the manhole. The frame 22 is generally level with the ground or roadbed 24. The manhole 20 may be preformed and buried below the ground and generally rests on a concrete base 26. Alternatively, the cementitous manhole may be formed insitu in a preformed ground opening. The manhole 20 communicates with a lower invert or lower sewer line 28 through a lower opening 30. In addition to the invert 28, other sewer lines 32 may communicate with the manhole 20 through various openings 34. A primary object of the present invention is to seal the communication between sewer lines 28 and 32 and the manhole 20 by the method of this invention, as now described.

As described, the method of this invention includes forming insitu and integral substantially continuous flexible monolithic polymeric coating 36 on the interior surface 38 of the manhole 20. In the preferred method, the coating 36 is formed by spraying the interior surface 38 of the manhole with a fast-curing plural component liquid polymer using a conventional spray gun 40, such as a Model GX7 spray gun available from Gusmer of Lakewood, N.J. The spray gun is connected by fluid lines 44 to a control unit (not shown) located above ground level. The control unit may include a proportioner, such as an H-2000 or H-3500 proportioner available from Gusmer which supplies and delivers about ten to thirty pounds of material per minute at a pressure of about 1,000 to 3,500 psi. Generally, an output rate of fifteen to twenty-five pounds per minute at about 1,200 to 2,500 psi is preferred. The operator 42 then sprays the interior surface 38 of the manhole, generally starting at the bottom. Because the components are relatively reactive and the preferred elastomeric material is fast-curing, the reactive components are preferably mixed directly in the spray gun 40.

In the preferred embodiment of the method of this invention, the entire interior surface 38 of the manhole 20 is sprayed with the polymeric coating material, including the steps or rungs (not shown). The preferred polymeric coating material is a plural component flexible polymer including isocyanate-terminated compounds, most preferably a polyurea coating formed by the reaction of isocyanate-terminated compounds and amine-terminated compounds. Polyurea coatings have better adhesion to the resin impregnated outer layer of the cured in place pipe discussed herein. Where the coating is applied to an existing manhole, the surface of the manhole should be prepared before spraying the coating by cleaning the brick, tile, concrete block and mortar or metal forming the surface and removing loose particles and foreign material from the surface. In most applications, a primer is preferably applied to the interior surface to be coated, such as an aqueous solution of silane, preferably containing about ten to thirty percent by weight silane. Preferred formulations for the polyurea coating is provided in the above-referenced patents of Foamseal.

Figure 2:
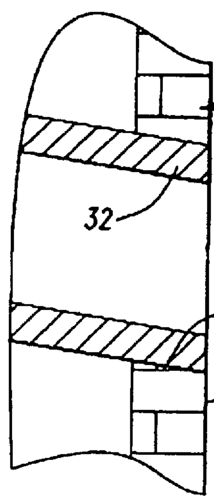
FIG. 2 is a partial cross-sectioned side view of a sewer line communicating with a manhole prior to sealing the communication by the method of this invention.
Figure 3:
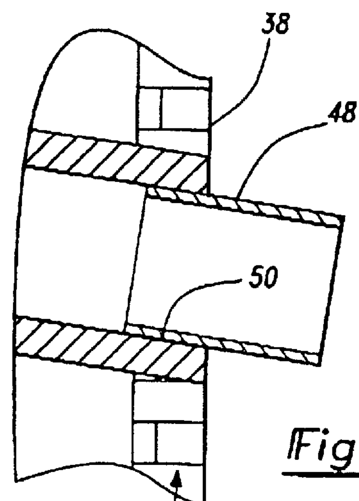
FIG. 3 is a partial side cross-sectional view similar to FIG. 2 following insertion of a tubular form in the sewer line.
Figure 4:
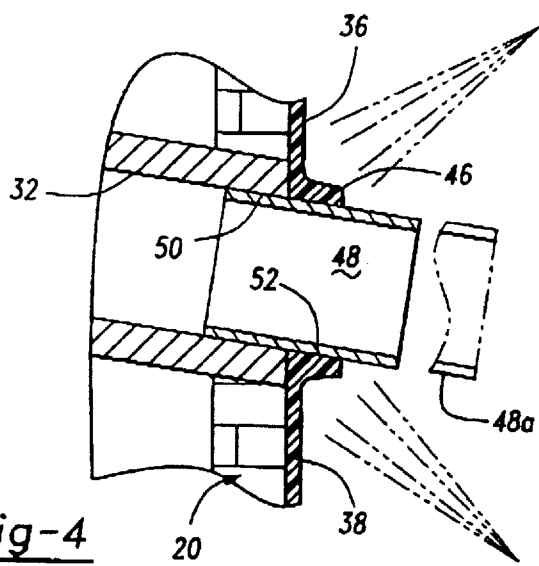
FIG. 4 illustrates a further step in the method of this invention wherein a tubular polymeric sealing member is formed integral with the polymeric coating on the interior surface of the manhole.

FIGS. 2 to 4 illustrate a preferred method of forming a tube-shaped polymeric sealing member 46 which is integral and continuous with the polymeric coating or liner 36 on the interior surface 38 of the manhole 20. FIG. 2 is a partial enlarged view of the manhole 20 surrounding the line 32 which communicates with the manhole through opening 34. In a preferred method, a cylindrical form 48 is first inserted in to the opening 50 of the sewer pipe or sewer line 32. The cylindrical form 48 may be easily formed by rolling a strip of cardboard to the approximate shape of the opening 50 inserting the tube in the opening 50, then expanding the cardboard "tube" until it fits snuggly in the opening 50; however, any cylindrical or tubular form may be used. The exterior surface of the form 48 may be coated with a conventional silicone release agent to permit easy removal of the form, following the application of the polymer coating. The interior surface 38 of the manhole 20 is then coated preferably with a plural component flexible polymeric coating as described above in regard to FIG. 1. The coating is then continued onto the cylindrical form 48 as shown in FIG. 4, thereby forming a tube-shaped sealing member 46 which extends into the manhole and is integral and continuous with the coating 36 on the interior surface of the manhole. Following curing of the tube-shaped polymeric sealing member 46, the form 48 is removed as shown at 48*a* of FIG. 4. The diameter of the inside surface 52 of the tube-shaped sealing member 46 is now generally equal to the inside diameter of the opening 50 in sewer line 32. This inside surface 52 may be roughened by rubbing the interior surface 52 with sandpaper or emery paper to provide a mechanical bond with the cured in place pipe as described below.

Figure 5:
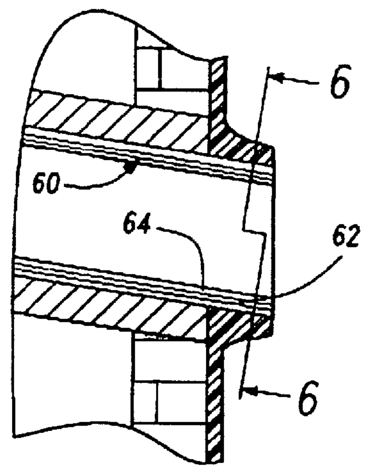
FIG. 5 is a partial side cross-sectional view similar to FIGS. 1 to 3 following insertion of a tubular liner through the sewer line.
Figure 6:
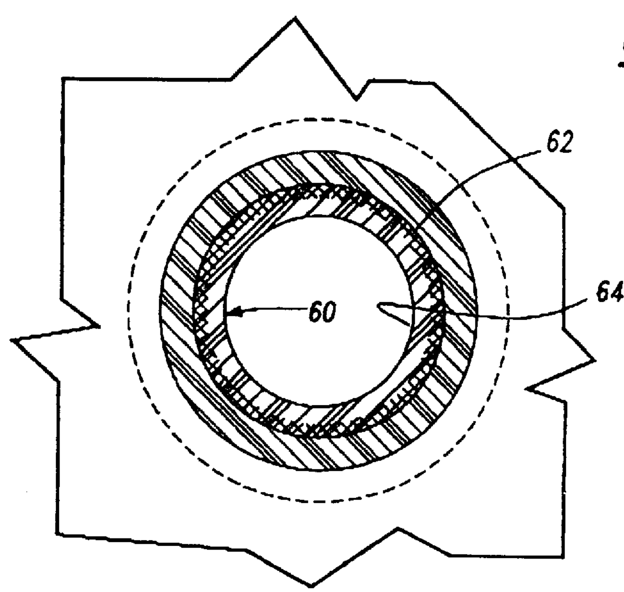
FIG. 6 is a cross-sectional view of FIG. 5 in the direction of view arrows 5—5.

The final step of the method of this invention comprises inserting a tubular liner 60 through the sewer line 32 into the tube-shaped sealing member 46 as shown in FIGS. 5 and 6. As described above, the tubular liner 60 has an uncured polymer on its exterior surface which is chemically compatible with the polymeric tube-shaped sealing member 46, such that a chemical bond is formed between the tubular liner 60 and the tube-shaped sealing member 46. As described above and in the above-referenced patents of Insituform, the tubular liner 60 may include an outer layer 60 of felt thoroughly saturated with an uncured liquid epoxy resin which is chemically compatible with flexible polymeric tube-shaped sealing member 46. The tubular liner 60 may also include a film 64 of an impermeable plastic, preferably a plastic having a relatively low coefficient of friction, such as polyurethane. Upon insertion, the tubular liner 60 is expanded and the thermoset resin in the felt layer 62 is cured, forming a self-supporting relatively rigid cured in place pipe 60. Because the thermoset resin is chemically compatible with the tube-shaped polymeric sealing member 46, the cured in place pipe 60 is simultaneously chemically bonded to the interior surface 52 of the tube-shaped sealing member 46. Where the internal surface 52 of the sealing member 46 is also roughened as described above, a mechanical and chemical bond is formed between the cured in place pipe 60 and the sealing member 46, sealing the communication between the cured in place pipe 60 and polymeric lining 36 on the interior surface of the manhole. This results is an integral sealed structure which prevents infiltration and inflow of groundwater from entering the manhole from around sewer line 32.

Figure 7:
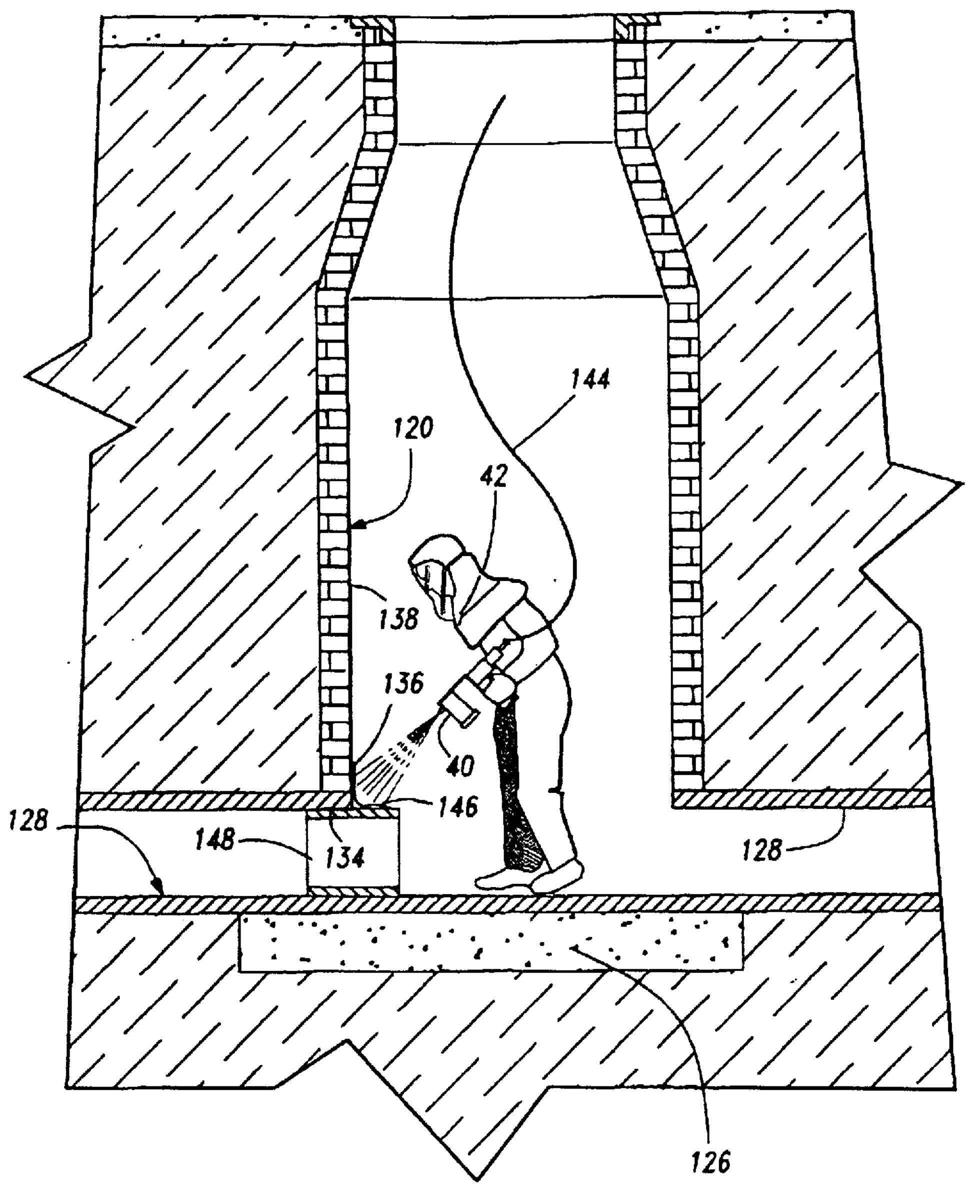
FIG. 7 illustrates the method of this invention used to seal an invert sewer line and manhole.

FIG. 7 illustrates a similar method of sealing the communication between an invert sewer line 128 and manhole 120. As will be understood by those skilled in the art, manholes vary in shape, size and configuration, including the lines entering and exiting the manhole. FIG. 7 is included to illustrate the method of this invention where the inverts 128 are to be rehabilitated with a tube-shaped liner (not shown) as described above. The elements are numbered in the same sequence as FIG. 1 for ease of description. As described above, a cylindrical or tubular form 148 is first inserted in the opening 134 of the lower sewer line or invert 128. The operator 42 then sprays the internal surface 138 and the external surface of the form 148 with a suitable flexible polymer, forming a coating 136 on the interior surface 138 of the manhole and a continuous generally tube-shaped sealing member 146 on the exterior surface of the tubular form 148. The form 148 is then removed as described above, and a tubular liner is inserted through line 128 into the tube-shaped sealing member 146 forming an integral sealed communication between line 128 and the lining 136 of manhole 120 as described above.

Having described the preferred embodiments of the method of this invention, it will be understood by those skilled in the art that various modifications may be made to the method of this invention within the purview of the appended claims. For example, the method of this invention is not limited to cured in place liners as described above in the patents of Insituform, provided the liner includes an exterior layer having an uncured resin which is chemically compatible with the tube-shaped polymeric sealing member formed by the method of this invention. Further, although the most preferred method of this invention includes spraying a fast-curing plural component polyurea elastomeric material onto the interior surface of the manhole and the cylindrical form, other flexible polymeric materials may also be used, including polyurethanes. Polyurea coatings are preferred, however, because of the chemical affinity between polyurea and the epoxy used in cured in place pipes. Further, the tube-shaped polymeric sealing member may be formed on the inside surface 34 of line 32, although in the preferred method the sealing member 46 extends into the manhole. The sealing member 46, 146 may be of any suitable length providing a sufficient bonding area for a good seal. However, a minimum length of about three inches has been found suitable for this application.

I claim:

1. A method of sealing a manhole and a line communicating with said manhole through an opening in said manhole, comprising the following steps:

forming in situ an integral substantially continuous monolithic polymeric coating on the interior surface of said manhole adhered to said interior surface;

forming a generally tube-shaped polymeric sealing member coaxially aligned with said manhole opening having an internal surface with a diameter generally equal to the internal diameter of said manhole opening integral and continuous with said polymeric manhole coating;

curing said polymeric manhole coating and said tube-shaped sealing member;

inserting a tubular liner through said line and into said cured tube-shaped sealing member, the tubular liner having an uncured polymer on its exterior surface chemically compatible with said tube-shaped polymeric sealing member; and curing said polymer on said tubular liner and permanently chemically bonding said liner exterior surface to said sealing member internal surface thereby sealing the communication between said line and said manhole.

2. The method of sealing a manhole and a line communicating therewith as defined in claim 1, wherein said method includes inserting a generally cylindrical form into said manhole opening such that the form extends into said manhole prior to forming said polymeric sealing member, and applying a polymeric coating on said form continuous with said polymeric coating on said interior surface of said manhole to form said generally tube-shaped polymeric sealing member.

3. The method of sealing a manhole and a line communicating therewith as defined in claim 2, wherein said method includes spraying a fast-curing plural component liquid polymer onto said interior surface of said manhole and continuing to spray said plural component liquid polymer onto said form to form said polymeric coating on said interior surface of said manhole and said tube-shaped polymeric sealing member integral and continuous with said polymeric manhole coating, and removing said form before inserting said tubular liner through said line and into said cured tube-shaped sealing member.

4. The method of sealing a manhole and a line communicating therewith as defined in claim 2, wherein said method includes spraying a fast-curing plural component liquid polyurea elastomeric material onto said interior surface of said manhole and said cylindrical form to form said polymeric coating on said interior surface of said manhole and said generally tube-shaped polymeric sealing member and, removing said tubular form before inserting the tubular liner through said line and into said tube-shaped polymeric sealing member wherein the tubular liner has an absorbent exterior layer saturated with an uncured resin chemically compatible with said tube-shaped polymeric sealing member.

5. A method of rehabilitating and sealing a manhole and a line communicating with said manhole through an opening in said manhole, comprising the following steps:

spraying a fast-curing elastomeric polymer including an isocyanate-terminated compound on the interior surface of said manhole to form a polymer coating on the manhole interior surface and a generally tube-shaped polymer sealing member of said fast-curing polymer coaxially aligned with said manhole opening having an internal surface with a diameter generally equal to the internal diameter of said opening integral and continuous with said polymer coating on said manhole interior surface;

curing said polymer coating on said manhole and said tube-shaped sealing member;

inserting a tubular liner through said line and into said cured tube-shaped polymer sealing member, the tubular liner having an uncured polymeric resin on its exterior surface chemically compatible with said tube-shaped polymer sealing member; and curing said polymeric resin on said liner and simultaneously permanently chemically bonding said liner exterior surface to said tube-shaped sealing member internal surface, thereby sealing the communication between said line and said manhole.

6. The method of rehabilitating and sealing a manhole and a line communicating therewith as defined in claim 5, wherein said method includes inserting a generally cylindrical form into said manhole opening such that the form extends into said manhole prior to forming said generally tube-shaped polymer sealing member, then spraying said fast-curing liquid polymer on said cylindrical form and said interior surface of said manhole thereby forming an integral continuous monolithic polymeric coating on said interior surface of said manhole and said continuous integral tube-shaped polymer sealing member, then removing said cylindrical form prior to inserting said tubular liner through said line and into said tube-shaped polymer sealing member.

7. The method of rehabilitating and sealing a manhole and a line communicating therewith as defined in claim 5, wherein said method includes rapidly mixing and initiating a reaction of an isocyanate-terminated compound having at least two reactive isocyanate groups and an amine-terminated compound having at least two reactive amine groups thereby forming a liquid fast-curing polyurea elastomeric material, spraying said fast-curing liquid polyurea elastomeric material on said manhole interior surface and a form coaxially aligned with said manhole opening thereby forming the polymer coating on said manhole interior surface and the tube shaped sealing member, wherein said tubular liner has an absorbent exterior layer saturated with an uncured liquid polymeric resin chemically compatible with said sprayed liquid fast-curing polyurea elastomeric material.

8. The method of rehabilitating and sealing a manhole and a line communicating therewith as defined in claim 5, wherein said method includes inserting a generally tubular form in said manhole opening such that the form extends into said manhole, then spraying said fast-curing polymer onto said tubular form and said interior surface of said manhole thereby forming the tube shaped sealing member on said tubular form continuous and integral with said polymer coating on said manhole interior surface.

9. A method of sealing a manhole and a line communicating with said manhole through an opening in said manhole, comprising the following steps:

inserting a generally cylindrical form in said manhole opening, the form including an exterior surface having a diameter generally equal to the internal diameter of said manhole opening such that the form extends into said manhole;

spraying said exterior surface of said form and the interior surface of said manhole with a fast-curing thoroughly mixed plural component elastomeric material having an isocyanate-initiated compound to form a monolithic polymeric coating on said interior surface of said manhole and a generally tubular polymeric sealing member on the exterior surface of said form continuous and integral with said polymeric coating on said manhole interior surface;

curing said polymeric coating on said manhole and said tubular sealing member and removing said form;

inserting a tubular liner through said line and into said cured tube-shaped polymeric sealing member, said tubular liner having an absorbent exterior layer saturated with a liquid uncured polymeric resin chemically compatible with said polymeric tubular sealing member; and curing said polymeric resin in said exterior layer of said tubular liner and simultaneously chemically bonding said polymeric resin to said interior surface of said tubular sealing member.

10. The method of sealing a manhole and a line communicating therewith as defined in claim 9, wherein said method includes rapidly mixing and initiating a reaction of an isocyanate-terminated compound having at least two reactive isocyanate groups and an amine-terminated compound having at least two reactive amine groups to form said elastomeric material.

* * * * *